United States Patent [19]
Hashimoto et al.

[11] Patent Number: 5,966,348
[45] Date of Patent: Oct. 12, 1999

[54] INFORMATION REPRODUCING METHOD AND APPARATUS FOR REPRODUCING INFORMATION BY MOVING MAGNETIC WALL

[75] Inventors: Morimi Hashimoto, Wako; Tsutomu Shiratori, Tokyo, both of Japan

[73] Assignee: Canon Kabushiki Kaisha, Tokyo, Japan

[21] Appl. No.: 08/932,914

[22] Filed: Sep. 18, 1997

[30] Foreign Application Priority Data

Sep. 19, 1996 [JP] Japan .................................. 8-248400

[51] Int. Cl.$^6$ ................................................ G11B 11/00
[52] U.S. Cl. ................................................ 369/13; 369/47
[58] Field of Search ............................. 369/13, 14, 116, 369/275.2, 47, 48, 59; 360/114, 59, 110, 113; 428/694 MM, 694 ML, 694 EC, 694 SC

[56] References Cited

U.S. PATENT DOCUMENTS

| | | | |
|---|---|---|---|
| 4,756,967 | 7/1988 | Hashimoto et al. | 428/336 |
| 4,910,068 | 3/1990 | Takagi et al. | 428/141 |
| 5,132,173 | 7/1992 | Hashimoto et al. | 428/336 |
| 5,321,672 | 6/1994 | Miyamoto et al. | 369/13 |
| 5,418,076 | 5/1995 | Shiratori | 428/694 EC |
| 5,629,909 | 5/1997 | Shiratori | 369/13 |
| 5,648,134 | 7/1997 | Shiratori et al. | 428/641 |
| 5,754,500 | 5/1998 | Tanaka et al. | 369/13 |

FOREIGN PATENT DOCUMENTS 6-290496  10/1994  Japan .

*Primary Examiner*—Ali Neyzari
*Attorney, Agent, or Firm*—Fitzpatrick, Cella, Harper & Scinto

[57] ABSTRACT

Method and apparatus for reproducing information by enlarging a magnetic domain on a medium by moving a magnetic wall. The apparatus includes a heating device for partially heating the medium in order to cause movement of the magnetic wall, and a magnetic head for detecting a leakage magnetic field generated in association with movement of the magnetic wall, wherein the information is reproduced on the basis of a detection result of the magnetic head. The medium is made up of a layer in which the magnetic wall moves, an intermediate layer, and a layer in which information is accumulated. The magnetic head is arranged on the layer side where the magnetic wall moves. The heating device is arranged on the side of the layer in which information is accumulated.

4 Claims, 6 Drawing Sheets

⊗ UPWARD MAGNETIZATION

⊙ DOWNWARD MAGNETIZATION

⊗ UPWARD MAGNETIZATION

⊙ DOWNWARD MAGNETIZATION

INFORMATION REPRODUCING METHOD AND APPARATUS FOR REPRODUCING INFORMATION BY MOVING MAGNETIC WALL

BACKGROUND OF THE INVENTION

1. Field of the Invention

The invention relates to a reproducing method and apparatus for reproducing high density information utilizing movement of a magnetic wall.

2. Related Background Art

In JP-A-6-290496, the inventors have proposed a magneto-optical recording medium in which a signal at a period that is equal to or lower than a diffraction limit of a light can be reproduced at a high speed by moving a magnetic wall without reducing an amplitude of a reproduction signal by devising a construction of the recording medium and a reading method, and also have proposed a reproducing method and a reproducing apparatus of such a magneto-optical recording medium.

SUMMARY OF THE INVENTION

In a novel reproducing method, it is an object of the invention to provide an information reproducing method and a reproducing apparatus that can realize a high recording density without further deteriorating a reproduction amplitude signal.

The above object is accomplished by reproducing method of a information by enlarging a magnetic domain on a medium by moving a magnetic wall, comprising the steps of: partially heating the medium in order to cause movement of the magnetic wall; and detecting a leakage magnetic field generated in association with movement of the magnetic wall by a magnetic head, thereby reproducing the information.

The above object is also accomplished by an information reproducing apparatus for reproducing information by enlarging a magnetic domain on a medium by moving a magnetic wall, comprising: heating means for partially heating the medium in order to cause movement of the magnetic wall; and a magnetic head for detecting a leakage magnetic field generated in association with movement of the magnetic wall, wherein the information is reproduced on the basis of a detection result of the magnetic head.

Further detailed explanation will be provided later with respect to various embodiments.

BRIEF DESCRIPTION OF THE DRAWINGS

FIG. 1A is a cross sectional view of the medium in a reproducing state and schematically shows orientation states of spins in first to third magnetic layers;

FIG. 1B shows a temperature distribution on the medium at a position shown in FIG. 1A;

FIG. 1C schematically shows a distribution of a magnetic wall energy density at a similar position and a distribution of a force acting on a magnetic wall in association with it;

FIG. 9A is a cross sectional view of the medium in a reproducing state and schematically shows orientation states of spins in first to third magnetic layers;

FIG. 9B shows a temperature distribution on the medium at a position shown in FIG. 9A; and FIG. 9C schematically shows a distribution of a magnetic wall energy density at a similar position and a distribution of a force acting on a magnetic wall in association with it.

DETAILED DESCRIPTION OF THE PREFERRED EMBODIMENTS

Figure 1A:
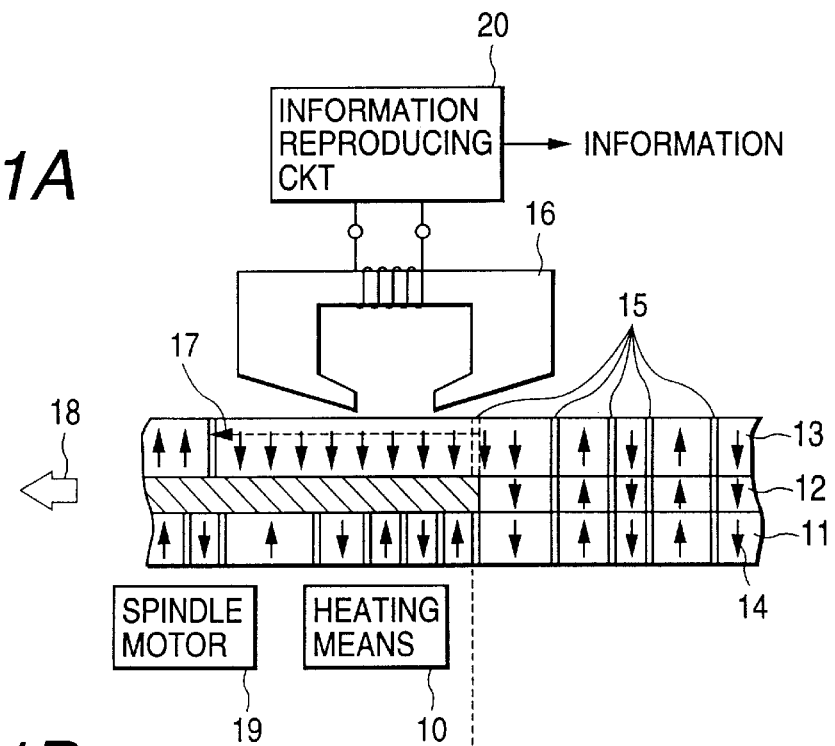
FIGS. 1A, 1B and 1C are diagrams schematically showing the concept of a reproducing method of a magnetic recording medium (perpendicular magnetization medium)
Figure 1B:
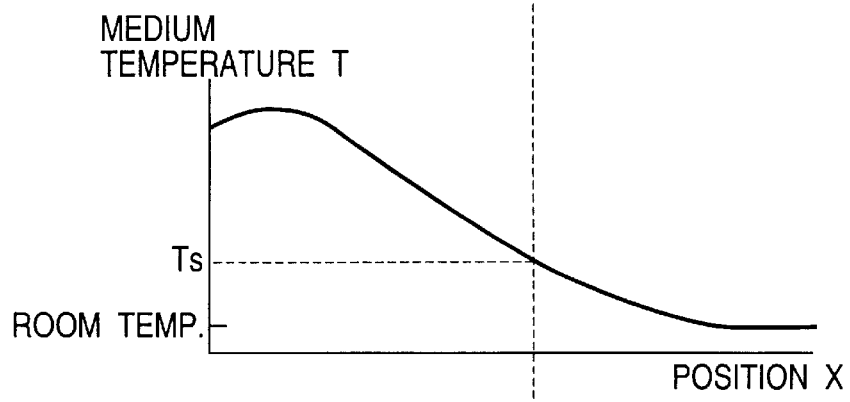
Figure 1C:
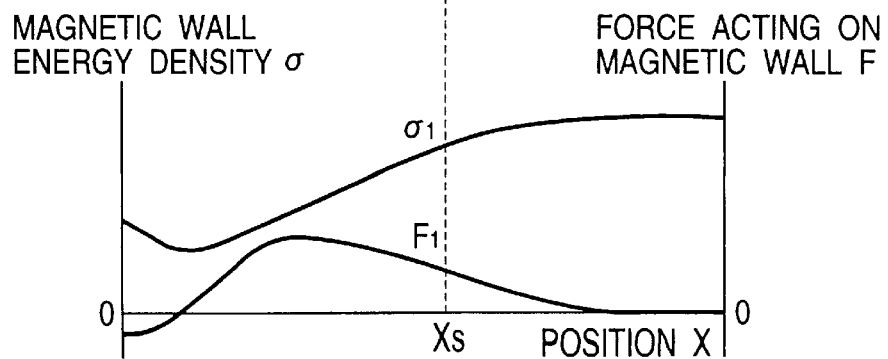

FIGS. 1A to 1C are schematic diagrams for explaining a magnetic recording medium (in the case of a perpendicular magnetization recording medium) and the operation of the reproducing method of such a medium in the invention.

FIG. 1A is a schematic cross sectional view of the magnetic recording medium of the invention. As magnetic layers of the medium, a first magnetic layer 11, a second magnetic layer 12, and a third magnetic layer 13 are sequentially laminated. An arrow 14 in each layer indicates the direction of an atomic spin. A magnetic wall 15 is formed in a boundary portion in a region in which directions of the spins are mutually opposite. Reference numeral 19 denotes a spindle motor to rotate the medium.

FIG. 1B is a graph showing a temperature distribution which is formed on the magnetic recording medium of the invention. As for the temperature distribution, a temperature profile is formed such that the temperature is raised from a portion at the front side of the gap of magnetic head 16 for reproducing by heating means 10 such as a light beam or the like, and a peak of the temperature comes behind the gap. At a position Xs, a medium temperature is equal to a temperature Ts near the Curie temperature of the second magnetic layer.

FIG. 1C is a graph showing a distribution of the magnetic wall energy density a1 of the third magnetic layer corresponding to the temperature distribution of FIG. 1B. As mentioned above, when there is a gradation of the magnetic wall energy density σ1 in the X direction, a force F1 which is obtained by the following equation Force F1=∂σ1/∂x acts on the magnetic wall of each layer existing at a position X.

The force F1 acts so as to move the magnetic wall in the direction of a low magnetic wall energy. In the third magnetic layer, since a magnetic wall coercivity is small and a magnetic wall mobility is large, the magnetic wall is easily moved by the force F1 in case of the sole layer. However, in a region before the position Xs (right side in the diagram), since the third magnetic layer is exchange-coupled to the first magnetic layer in which the medium temperature is still lower than Ts and the magnetic wall coercivity is large, the magnetic wall in the third magnetic layer is also fixed to the position corresponding to the position of the magnetic wall in the first magnetic layer.

In the invention, as shown in FIG. 1A, when the magnetic wall 15 exists at the position Xs of the medium, the medium temperature rises to the temperature Ts near the Curie temperature of the second magnetic layer and the exchange-coupling between the third and first magnetic layers is cut off. Thus, as shown by broken line arrows 17, the magnetic wall 15 in the third magnetic layer instantaneously moves to a region in which the temperature is higher and the magnetic wall energy density is small.

When the magnetic wall 15 passes under the gap portion of the magnetic head 16 for reproduction, all of the atomic spins of the third magnetic layer in the gap are aligned in one direction. Each time the magnetic wall 15 comes to the position Xs in association with the movement of the medium, the magnetic wall 15 instantaneously moves under the gap and all of the directions of the atomic spins in the gap are reversed and aligned in one direction. A leakage magnetic field generated at the time of the movement of the magnetic wall is detected by the magnetic head 16 and the detection result is processed by an information reproducing circuit 20, thereby reproducing information. According to the construction of the invention, an amplitude of a reproduction signal always becomes a constant and maximum amplitude is irrespective of an interval (namely, recording bit length) between the recorded magnetic walls. In other words, an inevitable reduction in reproduction output in association with the improvement of the recording density is remarkably improved and a further high density is realized.

Since a moving speed of the magnetic wall is not infinite, it is necessary to design in a manner such that the time that is required until the magnetic wall passes under the gap of the magnetic head is not longer than the time that is required for the medium pass by a distance corresponding to the shortest recording bit length.

Figure 9A:
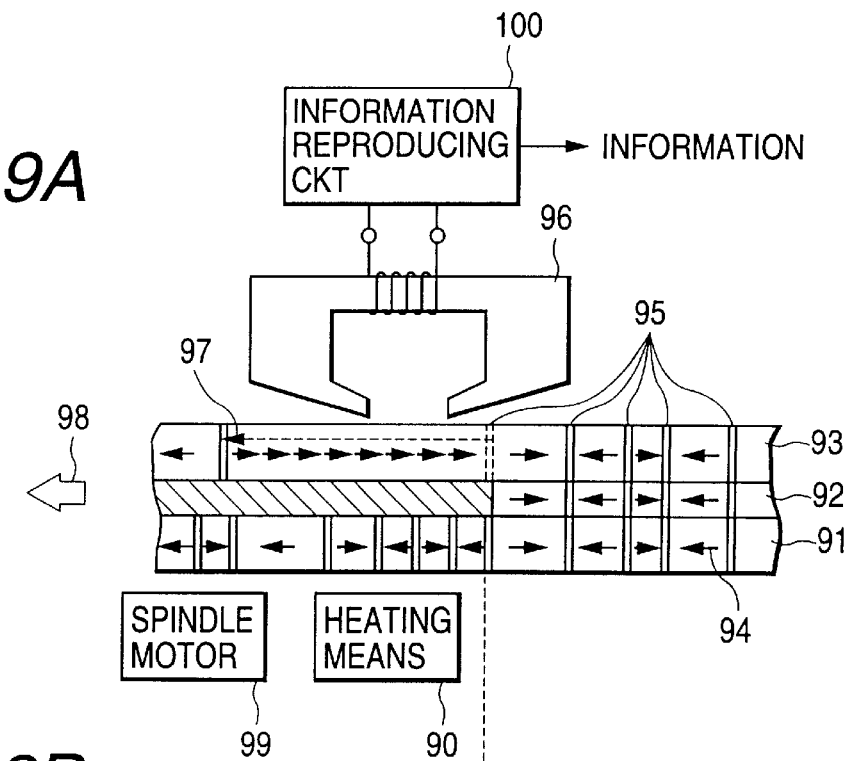
FIGS. 9A, 9B and 9C are diagrams schematically showing a concept of a reproducing method of a magnetic recording medium (inplane magnetization medium) of the invention.
Figure 9B:
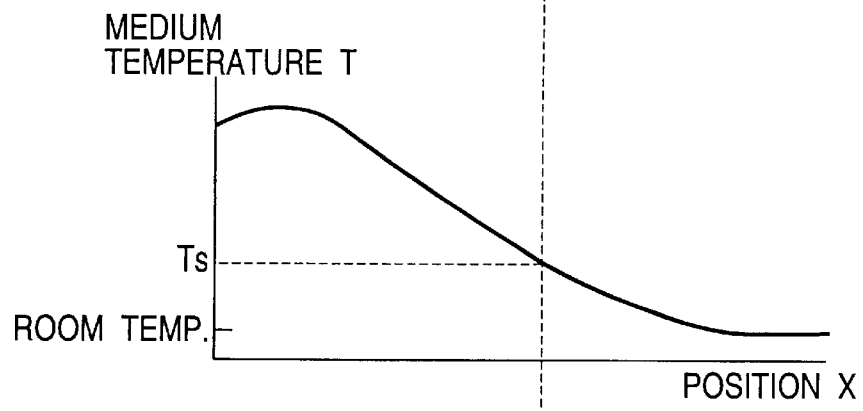
Figure 9C:
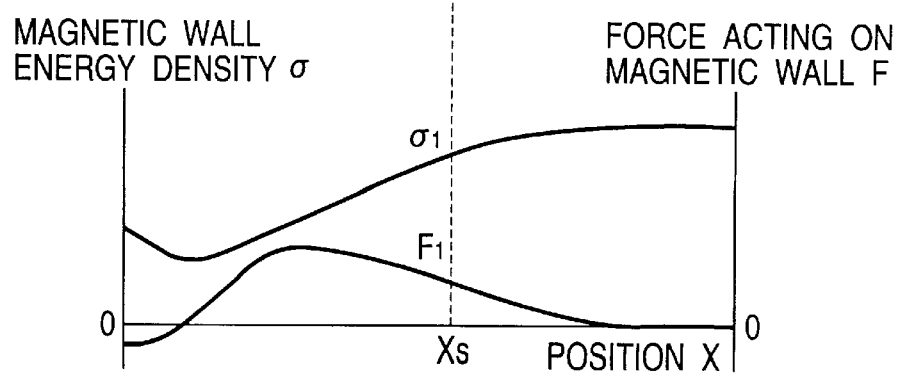

FIGS. 9A to 9C are schematic diagrams for explaining a magnetic recording medium (in the case of an in-plane magnetization recording medium) and the operation of the reproducing method of such a medium in the invention. In the case of the in-plane magnetization recording medium, in substantially the same manner, a magnetic wall 95 instantaneously moves under the gap of a magnetic head 96 and all of the directions of atomic spins in the gap are reversed and aligned in one direction. Thus, as shown in FIG. 9A, a constant and maximum reproduction signal amplitude can always be obtained irrespective of an interval (namely, recording bit length) between the recorded magnetic walls.

Embodiments to which the invention is applied will now be described with reference to the drawings.

Figure 2:
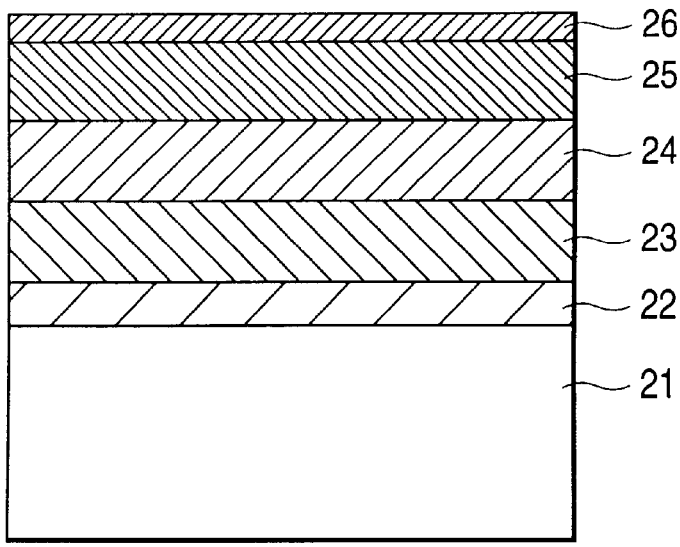
FIG. 2 is a schematic cross sectional view showing a construction of layers of a magnetic recording medium of the invention.

FIG. 2 is a schematic cross sectional view showing an embodiment of a construction of layers of a magnetic recording medium of the invention. In the embodiment, an underlayer 22, a first magnetic layer 23, a second magnetic layer 24, a third magnetic layer 25, and a protecting layer 26 are sequentially laminated on a transparent substrate 21.

As a transparent substrate 21, for instance, glass, polycarbonate, polyethylene terephthalate, polyethylene naphthalate, polyamide, polyimide, or the like can be used.

In order to improve a crystal orientation, magnetic characteristics, and recording/reproducing characteristics of the first magnetic layer, the underlayer 22 can be formed by an alloy mainly containing Fe, Co, Cr, Ni, Ge, or the like. For example, Cr, CrMo, FeNi, CoNi, Ge, etc. is used. It is ordinarily preferable to set a film thickness of the underlayer to a value within a range of 10 to 3000 Å, more desirably, 10 to 1000 Å.

The first magnetic layer 23, second magnetic layer 24, and third magnetic layer 25 can be made of various magnetic materials. For example, for the purpose of the improvement of magnetic characteristics and corrosion resistance or the like, a small quantity of element such as Cr, Mn, Cu, Ti, Al, Si, Pt, In, Ta, etc. can be also added into an alloy of an iron group element such as Fe, Co, Ni, etc.. An alloy of a rare earth metal element such as Pr, Nd, Sm, Gd, Tb, Dy, Ho, etc. can be also used. A material such as garnet, platinum group-iron group periodic structure film, platinum group-iron group alloy, or the like can be also used. As each of the first to third magnetic layers, an alloy thin film such as a hard disk or a coating type magnetic layer such as a magnetic tape can be used. It is ordinarily preferable to set a film thickness of each of the first to third magnetic layers to a value within a range of 10 to 5000 Å, more desirably, 50 to 2000 Å.

By "iron group" is meant the elements iron, cobalt, and nickel. By "platinum group" is meant the elements Ru, Pd, Os, Ir, and Pt.

As a first magnetic layer, a material is preferable in which values of a saturation magnetization and a magnetic anisotropy are large and a magnetization state (magnetic domain) can be stably held. For example, a Co system alloy magnetic layer such as CoCr, CoPt, CoCrPtTa, or the like, a rare earth-iron group amorphous alloy such as TbFeCo, DyFeCo, TbDyFeCo, or the like, a platinum group-iron group periodic structure film such as Pt/Co, Pd/Co, etc., or the like is preferable.

As a second magnetic layer, an alloy magnetic layer of a Co system or Fe system is preferable in which the Curie temperature is lower than those the Curie temperatures of the first and third magnetic layers, and in which a value of the saturation magnetization is smaller than that of the first magnetic layer. For example, the value of the saturation magnetization can be adjusted by controlling a composition ratio of the Co system or Fe system alloy magnetic layer. The Curie temperature can be adjusted by an addition amount of Co, Cr, Ti, or the like.

As a third magnetic layer, for example, a rare earth-iron group amorphous alloy of a relatively small magnetic anisotropy such as GdCo system, GdFe system, GdFeCo system, TbCo system, or the like, or a material such as garnet or the like for a bubble memory is desirable. Moreover, since information is reproduced by inductive magnetism, a larger value of the saturation magnetization is preferable.

The direction of the magnetic anisotropy of each of the first to third magnetic layers is not particularly limited. That is, any one of an in-plane magnetization recording film, perpendicular magnetization recording film, and oblique evaporation deposition magnetic recording film can be used as the first to third magnetic layers.

As a protecting layer 26 which is formed for the purpose of assuring abrasion resistance and corrosion resistance of the magnetic recording medium, a thin film of the carbon system such as DLC (diamond-like carbon), amorphous carbon, carbon hydride, or the like which is used in the ordinary magnetic recording medium is preferable. It is desirable to set a film thickness to a value within a range of 50 to 300 Å.

In a manner similar to the ordinary magnetic recording medium, it is preferable to coat a liquid lubricant of a fluorine system onto the protecting film of the carbon system so as to have a thickness within a range of 5 to 50 Å.

In a manner similar to the ordinary magnetic recording medium, according to the method of recording or reproducing the magnetic recording medium of the invention, an MIG (Metal-in-gap) head or a thin film head can be used. By using a read only MR head of a high reproducing sensitivity, a further high recording density also can be realized.

In the invention, the magnetic head is arranged on the third magnetic layer side and a leakage magnetic flux from the third magnetic layer is detected by the magnetic head.

In the invention, by arranging the heating means for a magnetic recording medium to the first magnetic layer side, a desired temperature distribution having a gradation for the moving direction of the magnetic head can be formed irrespective of a size of magnetic head.

The heating means is not particularly limited but any means can be used so long as a heat generating member in which a desired temperature distribution can be obtained. For example, a lamp, a thermal pen, an electron beam, or the like can be also used. It is, however, preferable to use a light beam because a position of a temperature corresponding to a movement start position of the magnetic wall can be easily obtained. As a light beam, a semiconductor laser of a wavelength in a range from the red light to the infrared light or the like can be used.

The invention will now be described further in detail with respect to specific Examples. The invention, however, is not limited to the following Examples so long as they do not depart from the spirit of the invention.

EXAMPLE 1

Figure 3:
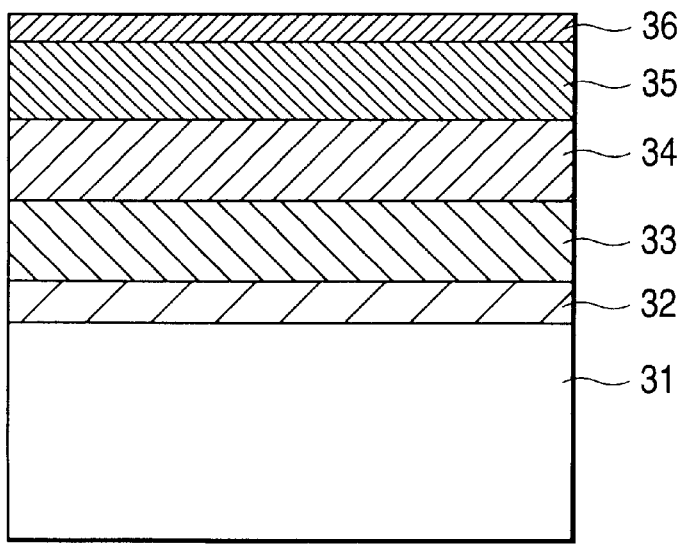
FIG. 3 is a schematic cross sectional view showing a construction of layers of a magnetic recording medium (embodiment 1) of the invention.

FIG. 3 shows a cross sectional constructional view of a magnetic recording medium of the invention.

A $Cr_{80}Ni_{20}$ underlayer 32 of a thickness of 50 nm is formed onto a glass substrate 31 having a thickness of 1.0 mm and a diameter of 2.5 inches by sputtering. A $Co_{77}Cr_{23}$ perpendicular magnetization film 33 having a thickness 200 nm is subsequently formed as a first magnetic layer onto the underlayer 32 by sputtering. A DyFe layer 34 having a thickness of 10 nm is further formed as a second magnetic layer onto the film 33 by sputtering. A TbCo layer 35 having a thickness of 30 nm is subsequently formed as a third magnetic layer onto the layer 34 by sputtering.

Subsequently, a DLC film having a thickness of 20 nm is formed as a protecting layer 36 by sputtering. Moreover, a film of PFPE (perfluoropolyether) having a thickness of 2 nm is coated onto the DLC film.

The Curie temperature of each magnetic layer is equal to 200° C. in the first magnetic layer, 70° C. in the second magnetic layer, and 300° C. in the third magnetic layer, respectively. Saturation magnetization Ms of the first magnetic layer is equal to 400 emu/cc and coercive force Hc($\perp$) is equal to 1200 Oe.

Figure 4A:
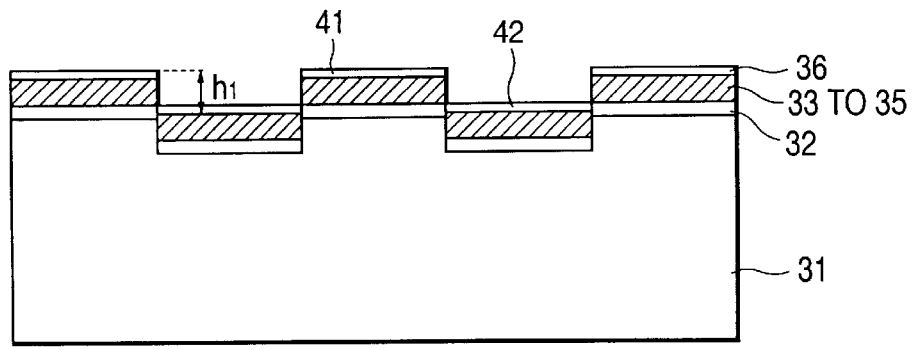
FIG. 4A is a diagram showing a cross sectional shape of the magnetic recording medium (embodiment 1) of the invention.

Recess and projection grooves as they were put into practical use in an optical disk are formed on the surface of the glass substrate 31 as shown in a cross sectional diagram of FIG. 4A. A projection portion (land) 41 is a track portion and is a surface where a recording/reproduction signal and a servo signal are actually recorded or reproduced. A recess portion (guide groove) 42 is a guard band portion. A width of projection portion 41 and a width of recess portion 42 are equal to 0.35 µm. A depth h1 of recess portion 42 (guide groove) is equal to 400 nm. Therefore, information is hardly recorded in the magnetic layer of the recess portion 42 (guide groove) due to a spacing loss. That is, the tracks are magnetically separated. The recess and projection grooves are formed by laser cutting.

Figure 4B:
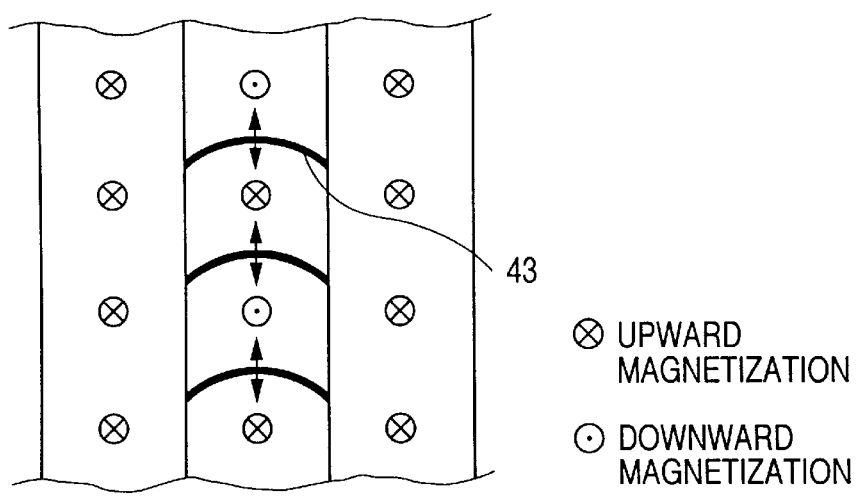
FIG. 4B is a conceptual diagram of a state of movement of a magnetic wall on the medium at the position shown in FIG. 4A as seen from a location above the medium.

When an inverted magnetic domain is formed on the whole width of the projection portion (land) 41, as shown in FIG. 4B, a magnetic wall 43 which is not closed is formed in a boundary portion of the magnetic domain on the land 41. Even if the magnetic wall 43 is moved in the track direction, since appearance and disappearance of the magnetic wall 43 of the track side portion are not accompanied, the magnetic wall 43 can be easily moved in the track direction.

Recording and reproducing characteristics of the magnetic recording medium obtained as mentioned above were measured.

A recording and reproducing apparatus used in the measurement is constructed by attaching a laser light source for heating to a general magnetic recording and reproducing apparatus (hard disk drive).

The magnetic head is a remodeled article of an ordinary MIG head and has a gap length of 0.15 µm and a track width of 0.35 µm.

A laser for heating has a wavelength of 1.3 µm and is installed through the medium on the side opposite to the magnetic head. The recording and reproducing operations is performed at a linear velocity of 5 m/sec.

First, the recording is performed by the MIG head and the shortest bit length was set to 0.15 µm.

Subsequently, upon reproduction, a power of the heating laser is set to 20 mW and the portion where the MIG head is in contact is mainly heated and reproduction is performed. Thus, a C/N ratio is equal to 50 dB at the bit length of 0.15 µm and adequate reproducing characteristics is obtained. An output in this instance is larger than an output reproduced by a read only MR head of a high sensitivity.

According to the invention, in spite of the fact that the reproduction signal is weakened in the narrow track, information is reproduced by the MIG head and a high output is derived, larger than that in the case of using the MR reproducing head. This is because the magnetic recording medium is partially heated, the magnetic exchange-couplings between the first and second magnetic layers and between the second and third magnetic layers are disconnected, the medium is set into a state in which the magnetic wall of the third magnetic layer can easily move, and the magnetic wall of the third magnetic layer is moved to a position where the temperature of the temperature distribution on the medium by the light spot is higher (where the magnetic wall energy density is smaller), so that the bit length is apparently increased and the increased information can be reproduced.

That is, according to the magnetic recording medium and its recording and reproducing method of the invention, the magnetic recording and reproduction of an ultrahigh density of a track width of 1 µm or less and a bit length of 0.2 µm or less can be performed even by using an ordinary cheap magnetic head by merely adding an assist of an optical head without using an expensive MR head which is hitherto inevitable and a reproducing sensitivity is high and a structure is complicated or the like. Therefore, a cheap magnetic recording medium of an ultrahigh density and its magnetic recording and reproducing apparatus can be provided.

EXAMPLE 2

Figure 5:
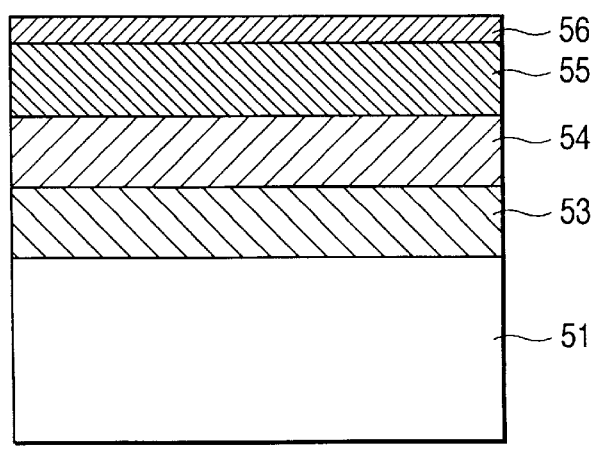
FIG. 5 is a schematic cross sectional view showing a construction of layers of a magnetic recording medium (embodiment 2) of the invention.

FIG. 5 shows a cross sectional constructional diagram of a magnetic recording medium of the invention.

A Co-O perpendicular magnetization film 53 having a thickness of 200 nm is formed as a first magnetic layer onto a PET substrate 51 having a thickness of 9 μm by sputtering. A DyFe layer 54 having a thickness of 10 nm is subsequently formed as a second magnetic layer onto the film 53 by sputtering. Further, a TbCo layer 55 having a thickness of 30 nm is formed as a third magnetic layer onto the layer 54 by sputtering.

A DLC film having a thickness of 10 nm is formed as a protecting layer 56 onto the layer 55 by sputtering. Moreover, a film of PFPE (perfluoropolyether) having a thickness of 2 nm is coated onto the layer 56.

The Curie temperature of each magnetic layer is equal to 220° C. in the first magnetic layer, 70° C. in the second magnetic layer, and 300° C. in the third magnetic layer, respectively. Saturation magnetization Ms of the first magnetic layer is equal to 380 emu/cc and coercive force Hc($\perp$) is equal to 800 Oe.

The magnetic recording medium formed in this manner is cut to a width of 8 mm, thereby forming a magnetic recording tape.

In a manner similar to a substrate which is used in a magnetic recording medium of the ordinary evaporation deposition type, in order to improve the durability, fine projections (mountain shape) are uniformly distributed and formed on the surface of the PET substrate 51 so as to have desired height (Ra=about 5 nm) and density ($10^6$/mm$^2$).

Figure 6A:
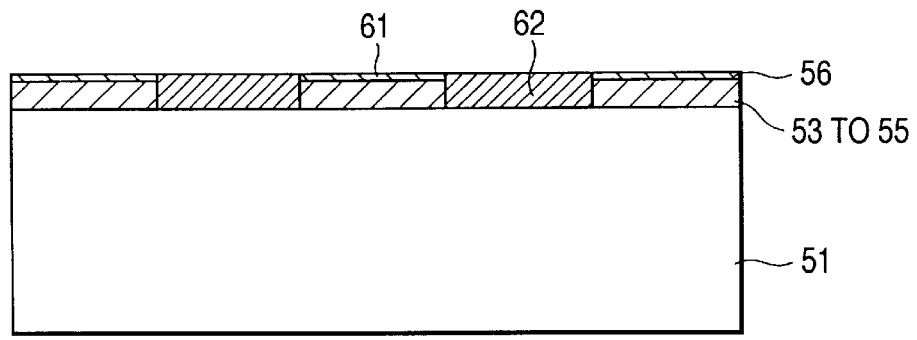
FIG. 6A is a diagram showing a cross sectional shape of the magnetic recording medium (embodiment 2) of the invention.

After the film is formed, a laser of a high power is irradiated while scanning the whole surface of the magnetic recording medium by a width of 0.5 μm and at a pitch of 1.5 μm and the irradiated portion is annealed. The magnetic layer in the annealed portion is altered and this portion becomes a metal film that doesn't function as a recording film, so that the tracks are completely separated. That is, as shown in FIG. 6A, a width of track 61 serving as a recording surface is equal to 1.0 μm and a width of guard band 62 is equal to 0.50 μm.

Figure 6B:
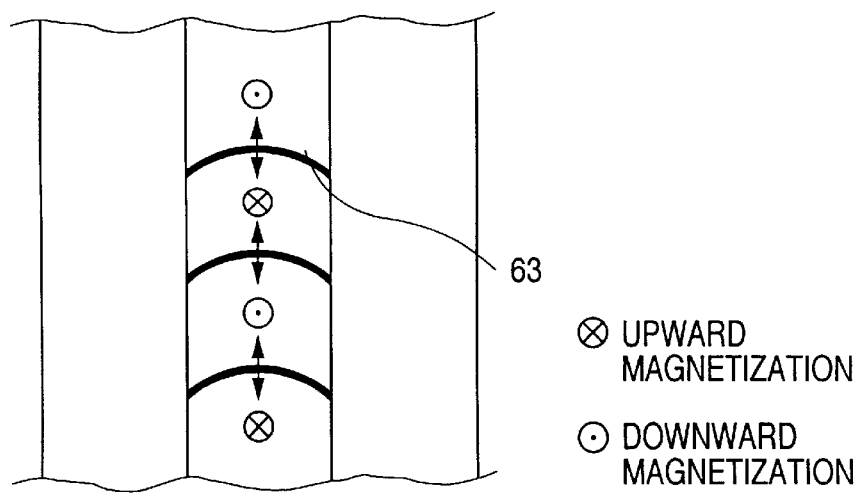
FIG. 6B is a conceptual diagram of a state of movement of a magnetic wall on the medium at the position shown in FIG. 6A is seen from a location over the medium.

When an inverted magnetic domain is formed to the whole width of the track portion 61, as shown in FIG. 6B, a magnetic wall 63 which is not closed is formed in a boundary portion of the magnetic domain on the track. Even if the magnetic wall 63 is moved in the track direction, since appearance and disappearance of the magnetic wall 63 of the track side portion are not accompanied, the magnetic wall 63 can be easily moved in the track direction.

Recording and reproducing characteristics are measured with respect to the magnetic recording medium obtained as mentioned above.

A recording and reproducing apparatus used for the measurement is obtained by attaching a laser light source for heating to a general magnetic recording and reproducing apparatus (8 mm playback deck).

As a magnetic head, a remodeled article of the ordinary MIG head for the 8 mm deck, a gap length is equal to 0.21 μm, and a track width is equal to 1.0 μm.

The laser for heating has a wavelength of 1.3 μm and is installed through the medium on the side opposite to the magnetic head.

The recording and reproduction is performed at a linear velocity of 5 m/sec.

First, the recording is performed by using the MIG head and the shortest bit length is set to 0.18 μm.

Subsequently, a power of the heating laser is set to 15 mW, a portion where the MIG head is in contact is mainly heated, and information is reproduced. Thus, at a bit length of 0.18 μm, a C/N ratio is equal to 52 dB and adequate reproducing characteristics are obtained.

Even in the Example as mentioned above, it has been found that, in spite of a fact that the track is narrowed and the reproduction signal is weakened, the information is reproduced by the MIG head and a high output at a practically usable level can be obtained.

That is, according to the magnetic tape and its recording and reproducing method of the invention, even if an ordinary cheap magnetic head is used, the magnetic recording and reproduction of an ultrahigh density of a track width of 1 μm or less and a bit length of 0.2 μm or less can be performed, a cheap magnetic recording medium of an ultrahigh density and its magnetic recording and reproducing apparatus can be provided.

Comparison 1

In Example 2, the magnetic recording medium is formed without magnetically separating the tracks and the recording and reproduction are performed by using the same magnetic head as that in Example 2 without heating the medium. Thus, the C/N ratio is reduced by 8 dB as compared with that of Example 2.

EXAMPLE 3

Figure 7:
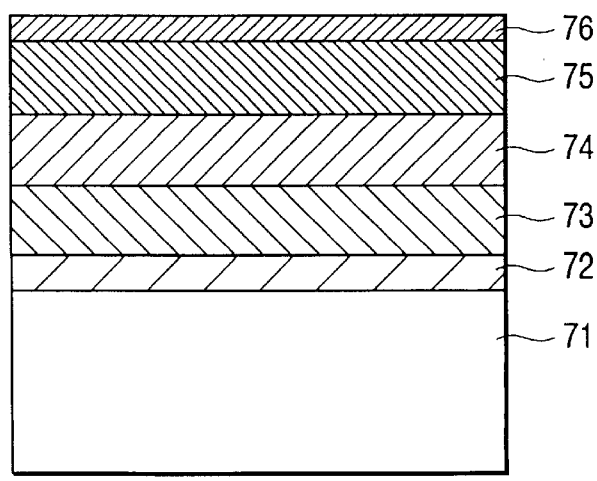
FIG. 7 is a schematic cross sectional view showing a construction of layers of a magnetic recording medium (embodiment 3) of the invention.

An example using in-plane magnetization films as first to third magnetic layers is now shown. FIG. 7 is a cross sectional constructional diagram of a magnetic recording medium of this Example.

A $Cr_{80}Ni_{20}$ underlayer 72 having a thickness of 25 nm is formed on a glass substrate 71 having a thickness of 1.0 mm and a diameter of 2.5 inches by sputtering. A $Co_{74}Cr_{17}Pt_5Ta_4$ in-plane magnetization film 73 having a thickness of 20 nm is subsequently formed as a first magnetic layer onto the layer 72 by sputtering. Further, a DyFe layer 74 having a thickness of 10 nm is formed as a second magnetic layer onto the film 73 by sputtering. A TbCo layer 75 having a thickness of 30 nm is formed as a third magnetic layer onto the layer 74 by sputtering.

Subsequently, a DLC film having a thickness of 10 nm is formed as a protecting layer 76 onto the layer 75 by sputtering. Moreover, a film of PFPE (perfluoropolyether) having a thickness of 2 nm is coated and formed on the layer 76.

The Curie temperature of each magnetic layer is equal to 250° C. in the first magnetic layer, 70° C. in the second magnetic layer, and 300° C. in the third magnetic layer, respectively. Saturation magnetization Ms of the first magnetic layer is equal to 400 emu/cc and coercive force Hc($\perp$) is equal to 2500 Oe.

Figure 8A:
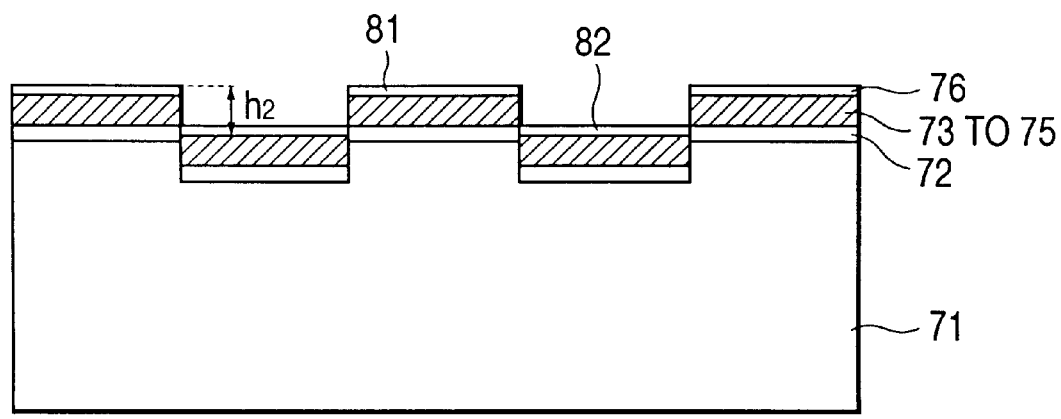
FIG. 8A is a diagram showing a cross sectional shape of the magnetic recording medium (embodiment 3) of the invention.

Recess and projection grooves as they are put into practical use in an optical disk are formed on the surface of the glass substrate 71 as shown in a cross sectional diagram of FIG. 8A. A projection portion (land) 81 is a track portion and is a surface where a recording/reproduction signal and a servo signal are actually recorded or reproduced. A recess portion (guide groove) 82 is a guard band portion. A width of projection portion 81 and a width of recess portion 82 are equal to 0.55 μm. A depth h2 of recess portion 82 (guide groove) is equal to 500 nm. Therefore, information is hardly recorded in the magnetic layer of the recess portion 82 (guide groove) due to a spacing loss. That is, the tracks are magnetically separated. The recess and projection grooves are formed by laser cutting.

Figure 8B:
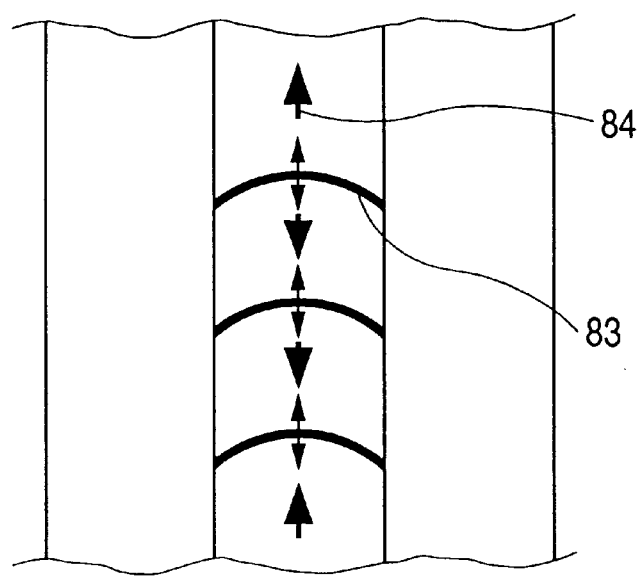
FIG. 8B is a conceptual diagram of a state of movement of a magnetic wall on the medium at the position shown in FIG. 8A as seen from a location above the medium.

When an inverted magnetic domain is formed on the whole width of the projection portion (land) 81, as shown in FIG. 8B, a magnetic wall 83 which is not closed is formed in a boundary portion of the magnetic domain on the land 81. Even if the magnetic wall 83 is moved in the track direction, since appearance and disappearance of the magnetic wall 83 of the track side portion are not accompanied, the magnetic wall 83 can be easily moved in the track direction.

Recording and reproducing characteristics of the magnetic recording medium obtained as mentioned above are measured.

A recording and reproducing apparatus used in the measurement is constructed by attaching a laser light source for heating to a general magnetic recording and reproducing apparatus (hard disk drive).

The magnetic head is a remodeled article of an ordinary MIG head and has a gap length of 0.20 μm and a track width of 0.60 μm.

A laser for heating has a wavelength of 1.3 μm and is installed through the medium on the side opposite to the magnetic head. The recording and reproducing operations are performed at a linear velocity of 5 m/sec.

First, the recording was performed by the thin film head and the shortest bit length was set to 0.18 μm.

Subsequently, upon reproduction, a power of the heating laser is set to 20 mW and the portion where the thin film head is in contact is mainly heated and the reproduction is performed. Thus, a C/N ratio is equal to 54 dB at the bit length of 0.18 μm and adequate reproducing characteristics are obtained.

According to the embodiment, in spite of the fact that the reproduction signal is weakened in the narrow track, information is reproduced by the thin film head and a high output at a practically usable level is derived. It has been found that the high density recording and reproduction can be performed in not only the perpendicular magnetization recording medium but also the in-plane magnetization recording medium.

EXAMPLE 4

The recording and reproduction is performed by substantially the same construction as that of Example 3, except that the MR head is used for reproduction. Thus, a C/N ratio of 55 dB is obtained in the bit length of 0.10 μm. That is, it has been found that a further high density can be accomplished by a combination of the present invention and the MR head having a high reproducing sensitivity.

According to the magnetic recording medium and its reproducing method and apparatus of the invention, a decrease in reproduction output due to the high recording density (realization of a fine bit area) is improved and the recording density and transfer speed can be remarkably improved.

The read only MR head having a high reproducing sensitivity which is used in association with the improvement of the recording density has a complicated structure and is expensive. According to the recording and reproducing method and recording and reproducing apparatus of the invention, however, even if the conventional cheap magnetic head is used, a reproduction of an ultrahigh density can be performed, so that the apparatus can be simplified and costs can be reduced.

The further high recording density can be accomplished by a combination of the recording/reproducing method, recording/reproducing apparatus, and read only MR head of a high reproducing sensitivity of the invention.

What is claimed is:

1. A method of reproducing information by enlarging a magnetic domain on a medium by moving a magnetic wall, said method comprising the steps of:

partially heating said medium in order to cause movement of said magnetic wall; and detecting, by a magnetic head, a leakage magnetic field generated in association with the movement of said magnetic wall, thereby reproducing said information.

2. An apparatus for reproducing information by enlarging a magnetic domain on a medium by moving a magnetic wall, said apparatus comprising:

heating means for partially heating said medium in order to cause movement of said magnetic wall; and a magnetic head for detecting a leakage magnetic field generated in association with the movement of said magnetic wall, wherein said information is reproduced on the basis of a detection result of said magnetic head.

3. An apparatus according to claim 2, wherein said medium is constructed by a layer in which the magnetic wall moves, an intermediate layer, and a layer in which information is accumulated, and said magnetic head is arranged on the side of said layer where said magnetic wall moves.

4. An apparatus according to claim 3, wherein said heating means is arranged on the side of said layer in which information is accumulated.

* * * * *